Patented June 11, 1940

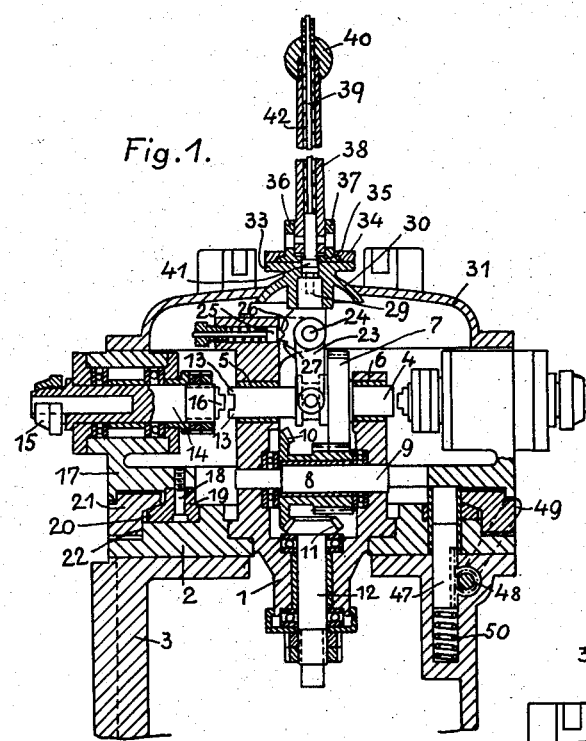
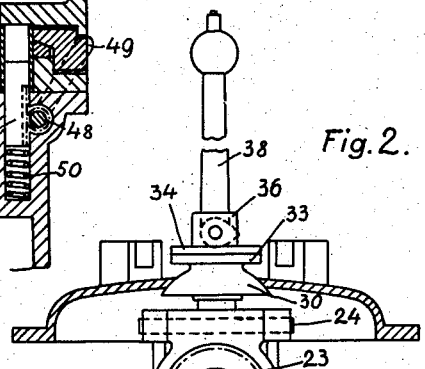
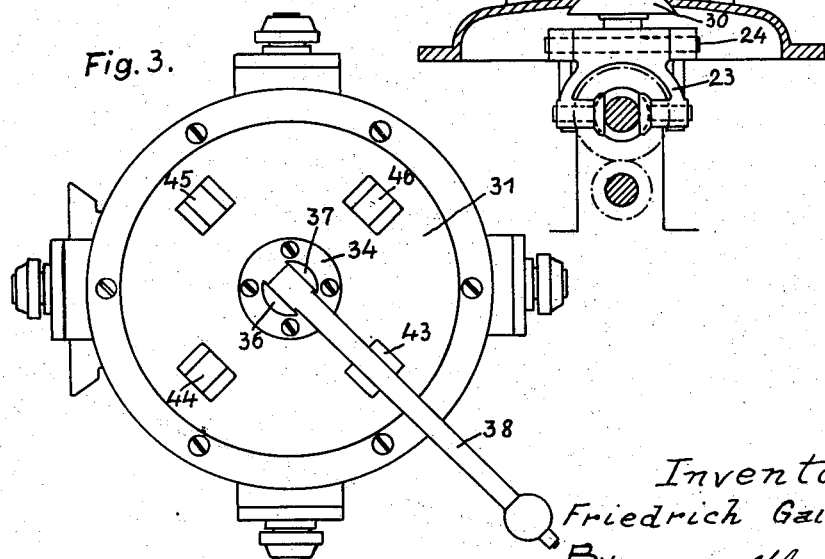

2,204,485

UNITED STATES PATENT OFFICE 2,204,485

MACHINE TOOL

Friedrich Gaitzsch, Chemnitz, Germany

Application February 25, 1938, Serial No. 192,667
In Germany March 3, 1937

3 Claims. (Cl. 77—25)

This invention relates to a machine tool having a rotary tool carrier head in which tool spindles are arranged radially to the axis thereof.

In order successively and satisfactorily to drive a plurality of tool spindles arranged transversely to the axis of the tool carrier head by means of spur gears, in contradistinction to known constructions, the invention provides in a bearing bracket disposed in the machine frame and encircled by the tool carrier head a driving shaft which is transversely positioned to the pivot of the tool carrier head and capable of being coupled with the tool spindle coaxially adjusted to it or with an auxiliary spindle driving shaft disposed in the tool carrier head above, beside or below the spindle concerned.

By way of example, one form of the invention is illustrated in the accompanying drawing, in which Figure 1 is an axial section of the tool carrier and of the driving means associated therewith; Fig. 2, a side view of the control lever; and Fig. 3, a plan of the control means for the tool carrier.

The bearing bracket 1 is firmly connected with the machine frame 3 by means of the centering ring 2. In the bracket 1, at 5 and 6, the tool driving shaft 4 is rotatably and axially displaceably arranged. A toothed wheel 7 secured to the shaft 4 engages a toothed wheel 8 whose teeth are broader than those of the wheel 7 to enable the wheel 7 to cooperate in the axial displacements of the shaft 4 without getting out of mesh with the wheel 8 which is attached to a shaft 9 rotatably but not axially displaceably disposed in the bracket 1. The toothed wheel 8 is firmly connected with the bevel gear 10 meshing with a bevel gear 11 which is supported by a shaft 12 rotatably arranged in the bracket 1 and directly or indirectly driven by a motor. Instead of using the bevel gears 10, 11 one could drive also the shafts 4, 9 from the motor shaft by means of a V-belt drive or pair of helical gears.

At one end of the shaft 4 claws 13 are provided for alternately coupling the shaft 4 with auxiliary shafts carrying the tools to be driven, as with the tool spindle 14, to the free end of which the tool, for instance a cutter, can be secured by means of a nut 15. Each of the auxiliary shafts 14 to be successively connected with the shaft 4 has a projection 16 which fits between the claws 13. The auxiliary shafts 14 are disposed in the tool carrier head 17 in known manner which is rotatably supported by the centering ring 2. For this purpose the member 17 is firmly united with the bearing ring 19 by screws 18. The ring 19 has a collar 20 embraced by the inner edge of a holding ring 21 which is connected with the centering ring 2 by a thread 22, so that the ring 21 can be adjusted by turning relative to the ring 2 and the ring 19 is held to the ring 2 without play, though in a slightly rotatable manner.

The general arrangement is therefore such that when the tool carrier head 17 is turned the auxiliary shafts 14 travel in a horizontal plane, which is also an axial plane of the shaft 4, about the shaft 4 and are thus successively adjustable relative to the end of the shaft 4 provided with the claws 13 to be coupled with the shaft by an axial displacement thereof.

Displacement of the shaft 4 is effected in known manner by means of a fork 23 which is movably disposed on the bracket 1 with the aid of a shaft 24 rectangularly positioned to and above the shaft 4. The fork 23 can be held in any position by a bolt 25 whose edge engages one of the clearances 26, 27 provided in the boss of the fork 23.

The fork 23 further supports an upwardly directed pin 29 to which the bell member 30 is secured the external surface of which has the form of a spherical segment about that point of the axis of the member 24 at which this axis is intersected by the axis of rotation of the tool carrier head 17. The bell member 30 serves for closing an opening in a cover 31 firmly connected with the tool carrier head 17 and shutting it off on top, whereby the bearing bracket 1 is protected against dust and withdrawn from sight.

To the upper flange 33 of the bell member 30 a bearing ring 34 is secured by screwing and holds the bushing 35 in such manner that it is rotatable relative to the bell 30 and the bracket 1.

The bushing 35 has two bosses 36, 37 in which a tubular lever 38 is arranged. Through the lever 38 extends a rod 39 whose free end projects like a knob from a spherical handle 40 which completes the lever 38. The member 35 possesses a central perforation 41 in which the lower end of the rod 39 can be inserted by depression of its end projecting from the handle 40. Owing to this arrangement, the lever 38 can be coupled with the bell member 30 and thus with the fork 23 in such manner that the motion of the lever 38 about the axis of the pin 24 is transmitted to the fork 23 and thereby the shaft 4 displaced in axial direction, whereby it is coupled with, or uncoupled from, the particular auxiliary shaft 14 that happens to be in front of it. The shaft 4 is held in position in the manner described by means of the bolt 25 acting on the fork 23.

When pressure is no longer exerted upon the free end of the rod 39, the latter is pushed up by a spring 42, so that the lower end of the rod 39 is brought out of range of the member 35 and the lever 38 is free to move about its bearing pin and can be adjusted to a horizontal position. It may then be inserted in one of the four claws 43, 44, 45, 46 provided on the upper side of the cover 31 which can thus be turned by the lever 38 to drive the tool carrier head 17 and bring another auxiliary shaft 14 in front of the driving shaft 4 so as to apply another tool or cutter. As the lever 36 can be successively brought into engagement with all four claws 43, 44, 45, 46 and can be swung about the axis of the tool carrier head, it can be used in a position most convenient to the operator.

The tool carrier head 17 is held in any position by a bolt 47 which can be introduced into a bore of the bearing ring 19 firmly united with the head 17 and is actuated by a pinion 48 that can be turned by means of the handle 49. A spring 50 presses the bolt into operative position.

The construction described can be varied in many ways. Above all, it is not absolutely necessary to use the lever 38 for turning the tool carrier head 17 which could also be operated by means of handles provided at the outer edge of the cover 31. In this instance, the handle 49 could be connected by levers with the bell 30 and thereby with the fork 23 in such manner that during release of the tool carrier head 17 the shaft 4 would be simultaneously brought into inoperative position.

Coupling of the driving shaft with the auxiliary shafts to be driven can be effected in any suitable manner. The driving shaft 4 may be disposed below the plane of the auxiliary shafts each of which may support a toothed or friction wheel which cooperates with a toothed or friction wheel on the free end of the shaft 4 when the turning of the tool carrier head has brought the auxiliary shaft concerned within range of the toothed or friction wheel disposed on the driving shaft.

Instead of arranging it parallel to the auxiliary shaft to be driven the driving shaft could be disposed also vertically to the plane of the auxiliary shafts and provided with a conical toothed or friction wheel. If, in this instance, the axis of the driving shaft were positioned in the axis of rotation of the tool carrier head, all auxiliary shafts would be driven jointly. It would be necessary to cover those tools that were to remain inoperative by a plate whilst the working tool would be held up to the work. It would further be possible to arrange the vertical driving shaft outside the axis of rotation of the tool carrier head, in which case only the auxiliary shaft would be driven through bevel or friction gears which was adjusted to the plane passing through the axes of the driving shaft and tool carrier head.

Furthermore, the auxiliary shaft coupled within the tool carrier head with the driving shaft may serve for driving another shaft or spindle whose axis need not intersect the axis of the tool carrier head. This shaft or spindle could be disposed beside, above or below the auxiliary shaft driving it and extend even obliquely thereto.

I claim:

1. A machine tool, comprising a frame, a rotatable tool carrier head, a plurality of tool spindles rotatably arranged in said head radially to the axis thereof, a bearing bracket disposed in said frame and encircled by said head, a tool driving shaft positioned in said bracket transversely to the pivot of said head, tool spindles disposed in said head, means for detachably coupling said driving shaft with the tool spindle coaxially adjusted relative to said driving shaft, and means for axially displacing the driving shaft, in the bearing bracket comprising a fork adjustably disposed in a recessed portion of the tool carrier head, a lever projecting from said head for operating said fork and a spherical covering on said fork to shut off the recess.

2. A machine tool, comprising a frame, a rotatable tool carrier head, a plurality of tool spindles rotatably arranged in said head radially to the axis thereof, a bearing bracket disposed in said frame and encircled by said head, a tool driving shaft positioned in said bracket transversely to the pivot of said head, tool spindles disposed in said head, means for detachably coupling said driving shaft with the tool spindle coaxially adjusted relative to said driving shaft, and means for axially displacing the driving shaft in the bearing bracket comprising a fork adjustably disposed in a recessed portion of the tool carrier head, a lever projecting from said head for operating said fork, a spherical covering on said fork to shut off the recess, a joint in said lever and claws on the upper side of the tool carrier head for receiving the reversed lever to adjust the head.

3. A machine tool, comprising a frame, a rotatable tool carrier head, a plurality of tool spindles rotatably arranged in said head radially to the axis thereof, a bearing bracket disposed in said frame and encircled by said head, a tool driving shaft positioned in said bracket transversely to the pivot of said head, tool spindles disposed in said head, means for detachably coupling said driving shaft with the tool spindle coaxially adjusted relative to said driving shaft, and means for axially displacing the driving shaft in the bearing bracket comprising a fork adjustably disposed in a recessed portion of the tool carrier head, a lever projecting from said head for operating said fork, a spherical covering on said fork to shut off the recess, a joint in said lever, claws on the upper side of the tool carrier head for receiving the reversed lever to adjust the head, means for locking the head in working position and means for connecting the fork with said locking means to release the head for adjustment during reversing of the lever.

FRIEDRICH GAITZSCH.